US009869499B2

(12) United States Patent
Liu et al.

(10) Patent No.: US 9,869,499 B2
(45) Date of Patent: Jan. 16, 2018

(54) METHOD FOR DETECTION OF LOSS OF REFRIGERANT

(71) Applicant: Carrier Corporation, Farmington, CT (US)

(72) Inventors: Lucy Yi Liu, Fayetteville, NY (US); Jian Sun, Fayetteville, NY (US)

(73) Assignee: CARRIER CORPORATION, Farmington, CT (US)

( * ) Notice: Subject to any disclaimer, the term of this patent is extended or adjusted under 35 U.S.C. 154(b) by 561 days.

(21) Appl. No.: 14/376,890

(22) PCT Filed: Feb. 4, 2013

(86) PCT No.: PCT/US2013/024575
§ 371 (c)(1),
(2) Date: Aug. 6, 2014

(87) PCT Pub. No.: WO2013/119489
PCT Pub. Date: Aug. 15, 2013

(65) Prior Publication Data
US 2015/0007591 A1    Jan. 8, 2015

Related U.S. Application Data

(60) Provisional application No. 61/597,275, filed on Feb. 10, 2012.

(51) Int. Cl.
F25B 45/00    (2006.01)
F25B 49/00    (2006.01)
G01K 13/02    (2006.01)

(52) U.S. Cl.
CPC .............. *F25B 45/00* (2013.01); *F25B 49/00* (2013.01); *F25B 49/005* (2013.01); *G01K 13/02* (2013.01);
(Continued)

(58) Field of Classification Search
CPC ................ F25B 45/00; F25B 2500/222; F25B 2700/21171; F25B 2600/05
See application file for complete search history.

(56) References Cited

U.S. PATENT DOCUMENTS 2,160,276 A   4/1937   McKee
2,893,217 A   10/1955  Nigro
(Continued)

FOREIGN PATENT DOCUMENTS

CN    101504177 A    8/2009
CN    100549574 C    10/2009
(Continued)

OTHER PUBLICATIONS

English Translation of JP 2007092636.*
(Continued)

*Primary Examiner* — Etsub Berhanu
*Assistant Examiner* — Nelson Nieves
(74) *Attorney, Agent, or Firm* — Cantor Colburn LLP (57) ABSTRACT

A method is provided for detecting in real-time a refrigerant charge loss in a refrigerant vapor compression system. If both a sensed evaporator outlet superheat exceeds a target evaporator outlet superheat by at least a preset amount of superheat and a sensed degree of openness of an electronic expansion valve exceeds a preset degree of openness for a preset time of period, and a sensed air temperature of either a flow of supply air having traversed the evaporator or a flow of return air returning to the evaporator is changing at a rate less than preset air temperature rate of change, a service alarm is generated indicating a loss of charge warning.

12 Claims, 5 Drawing Sheets

(52) U.S. Cl.
CPC ..... *F25B 2345/003* (2013.01); *F25B 2400/13* (2013.01); *F25B 2500/222* (2013.01); *F25B 2600/024* (2013.01); *F25B 2600/026* (2013.01); *F25B 2600/2513* (2013.01); *F25B 2700/151* (2013.01); *F25B 2700/171* (2013.01); *F25B 2700/1931* (2013.01); *F25B 2700/1933* (2013.01); *F25B 2700/21151* (2013.01); *F25B 2700/21152* (2013.01); *F25B 2700/21172* (2013.01); *F25B 2700/21173* (2013.01)

(56) References Cited

U.S. PATENT DOCUMENTS

| | | | |
|---|---|---|---|
| 3,491,544 | A | 4/1968 | Webber |
| 4,008,755 | A | 2/1977 | Vandamme |
| 4,633,681 | A | 1/1987 | Webber |
| RE32,451 | E | 7/1987 | Proctor et al. |
| 4,711,096 | A | 12/1987 | Krantz |
| 4,798,057 | A * | 1/1989 | Okamoto ............ F25B 49/025 62/209 |
| 4,856,288 | A | 8/1989 | Weber |
| 5,009,076 | A | 4/1991 | Winslow |
| 5,079,930 | A | 1/1992 | Beaverson et al. |
| 5,174,125 | A | 12/1992 | Duncan |
| 5,186,014 | A | 2/1993 | Runk |
| 5,228,304 | A | 7/1993 | Ryan |
| 5,243,829 | A | 9/1993 | Bessler |
| 5,264,833 | A | 11/1993 | Jeffers et al. |
| 5,323,847 | A | 6/1994 | Koizumi et al. |
| 5,337,576 | A | 8/1994 | Dorfman et al. |
| 5,351,037 | A | 9/1994 | Martell et al. |
| 5,351,500 | A | 10/1994 | Morrow |
| 5,457,965 | A | 10/1995 | Blair et al. |
| 5,539,385 | A | 7/1996 | Duff et al. |
| 5,684,463 | A | 11/1997 | Diercks et al. |
| 5,713,213 | A | 2/1998 | Nobuta et al. |
| 5,860,286 | A | 1/1999 | Tulpule |
| 6,073,455 | A | 6/2000 | Tachigori et al. |
| 6,098,412 | A | 8/2000 | Porter et al. |
| 6,122,955 | A | 9/2000 | Hoog et al. |
| 6,425,253 | B1 | 7/2002 | Gale et al. |
| 6,446,505 | B1 | 9/2002 | Wieszt et al. |
| 6,460,354 | B2 | 10/2002 | Yabuki |
| 6,772,598 | B1 | 8/2004 | Rinehart |
| 6,826,948 | B1 | 12/2004 | Bhatti et al. |
| 6,868,678 | B2 | 3/2005 | Mei et al. |
| 6,981,384 | B2 | 1/2006 | Dobmeier et al. |
| 7,076,373 | B1 | 7/2006 | Munsterhuis et al. |
| 7,343,750 | B2 | 3/2008 | Lifson et al. |
| 7,377,118 | B2 | 5/2008 | Esslinger |
| 7,380,404 | B2 | 6/2008 | Kang et al. |
| 7,386,985 | B2 | 6/2008 | Concha et al. |
| 7,389,649 | B2 | 6/2008 | Pham et al. |
| 7,490,477 | B2 | 2/2009 | Singh et al. |
| 7,512,523 | B2 | 3/2009 | Johnson et al. |
| 7,665,315 | B2 | 2/2010 | Singh et al. |
| 7,712,319 | B2 | 5/2010 | Braun, II et al. |
| 7,845,179 | B2 | 12/2010 | Singh et al. |
| 7,905,098 | B2 | 3/2011 | Pham |
| 8,024,937 | B2 | 9/2011 | Minor |
| 8,037,700 | B2 | 10/2011 | Shah et al. |
| 2002/0121100 | A1 * | 9/2002 | Yabuki ................ F25B 49/005 62/228.1 |
| 2005/0056031 | A1 | 3/2005 | Jeong |
| 2005/0086951 | A1 | 4/2005 | Dobmeier et al. |
| 2005/0092070 | A1 | 5/2005 | Bhatti |
| 2005/0103029 | A1 | 5/2005 | Kawahara et al. |
| 2005/0126190 | A1 | 6/2005 | Lifson et al. |
| 2006/0042276 | A1 | 3/2006 | Doll, Jr. et al. |
| 2006/0042277 | A1 | 3/2006 | Sadegh et al. |
| 2007/0256436 | A1 * | 11/2007 | Hayashi ................ F25B 49/022 62/161 |
| 2008/0104976 | A1 | 5/2008 | Guglielmetti et al. |
| 2009/0019875 | A1 | 1/2009 | Fink et al. |
| 2009/0107157 | A1 | 4/2009 | Dube |
| 2009/0241573 | A1 | 10/2009 | Ikegami et al. |
| 2010/0300129 | A1 | 12/2010 | Bean, Jr. et al. |
| 2011/0112814 | A1 | 5/2011 | Clark |
| 2011/0174059 | A1 | 7/2011 | Yonemori et al. |
| 2011/0277541 | A1 | 11/2011 | Kadle et al. |

FOREIGN PATENT DOCUMENTS

| | | | |
|---|---|---|---|
| DE | 4008877 | A1 | 10/1991 |
| EP | 1475588 | A1 | 11/2004 |
| FR | 2797038 | A1 | 2/2001 |
| GB | 2428896 | A | 2/2007 |
| JP | S58198632 | A | 11/1983 |
| JP | S6137725 | A | 2/1986 |
| JP | 01300170 | A | 12/1989 |
| JP | H1183246 | | 3/1999 |
| JP | H1194408 | | 4/1999 |
| JP | 2000105032 | A | 4/2000 |
| JP | 2002039649 | A | 2/2002 |
| JP | 2007092636 | A * | 4/2007 ............ F04B 49/10 |
| WO | 20003060400 | A1 | 7/2003 |
| WO | 2005124325 | A2 | 12/2005 |
| WO | 2007022779 | A1 | 3/2007 |
| WO | 2007142920 | A2 | 12/2007 |
| WO | 2010062923 | A1 | 6/2010 |

OTHER PUBLICATIONS

Chinese First Office Action and Search for application CN 201380008779.5, dated Feb. 26, 2016, 7 pages.

PCT International Search Report and Written Opinion of the International Searching Authority, or the Declaration for International Application No. PCT/US2013/024575, dated Dec. 6, 2013, 20 pages.

International Preliminary Report on Patentability for application PCT/US2013/024575, dated Aug. 12, 2014, 14 pages.

* cited by examiner

METHOD FOR DETECTION OF LOSS OF REFRIGERANT

BACKGROUND OF THE INVENTION

This invention relates generally to vapor compression systems and, more particularly, to detection of a loss of refrigerant in a refrigerant vapor compression system.

Conventional vapor compression systems typically include a compressor, a heat rejection heat exchanger, a heat absorption heat exchanger, and expansion device, commonly an expansion valve, disposed upstream with respect to working fluid flow, of the heat absorption heat exchanger and downstream of the heat rejection heat exchanger. These basic system components are interconnected by working fluid lines in a closed circuit, arranged in accord with known vapor compression cycles.

In some vapor compression systems, capacity modulation capability may be added by incorporating a flash tank economizer into the working fluid circuit between the heat rejection heat exchanger and the evaporator. In such case, the working fluid leaving the heat rejection heat exchanger is expanded through an economizer expansion device, such as a thermostatic expansion valve or an electronic expansion valve, prior to entering the flash tank wherein the expanded fluid separates into a liquid component and a vapor component. The vapor component is thence directed from the flash tank into an intermediate pressure stage of the compression process of a multi-stage compression device, while the liquid component is directed from the flash tank through the system's main expansion valve prior to entering the evaporator.

Refrigerant vapor compression systems are commonly used for conditioning air to be supplied to a climate controlled comfort zone within a residence, office building, hospital, school, restaurant or other facility. Refrigerant vapor compression system are also commonly used for refrigerating air supplied to display cases, merchandisers, freezer cabinets, cold rooms or other perishable/frozen product storage areas in commercial establishments. Refrigerant vapor compression systems are also commonly used in transport refrigeration systems for refrigerating air supplied to a temperature controlled cargo space of a truck, trailer, container or the like for transporting perishable/frozen items by truck, rail, ship or intermodal.

Refrigerant vapor compression systems used in connection with transport refrigeration systems are generally subject to more stringent operating conditions than in air conditioning or commercial refrigeration applications due to the wide range of operating load conditions and the wide range of outdoor ambient conditions over which the refrigerant vapor compression system must operate to maintain product within the cargo space at a desired temperature. The desired temperature at which the cargo needs to be controlled can also vary over a wide range depending on the nature of cargo to be preserved. The refrigerant vapor compression system must not only have sufficient capacity to rapidly pull down the temperature of product loaded into the cargo space at ambient temperature, but also operate efficiently at low load when maintaining a stable product temperature during transport. Additionally, transport refrigerant vapor compression systems are subject to cycling between an operating mode and standstill mode, i.e. an idle state.

In all refrigerant vapor compression systems, the system must be filled with a refrigerant in an amount sufficient to ensure an adequate amount of refrigerant within the system, commonly referred to as the refrigerant charge, under all operating conditions. An inadequate refrigerant charge can reduce system performance and can lead to system malfunction and damage to system components such as the compressor. It is possible for the refrigerant charge in the system to be initially too low due to human error in filling the system with refrigerant at the manufacturing site or during field installation. It is also possible for the refrigerant charge to be reduced during operation of the system due to leaks which, if undetected and unaddressed, result in the refrigerant charge dropping low enough that system performance is adversely affected and system components damaged.

SUMMARY OF THE INVENTION

The refrigerant charge within a refrigerant vapor compression system is monitored for early detection of refrigerant charge loss in the refrigerant vapor compression system. In an aspect of the method, a control initiates either a service alarm or a shut down alarm depending on the degree of loss of the refrigerant charge.

A method is provided for detecting in real-time a refrigerant charge loss in a refrigerant vapor compression system. If both a sensed evaporator outlet superheat exceeds a target evaporator outlet superheat by at least a preset amount of superheat and a sensed degree of openness of an electronic expansion valve exceeds a preset degree of openness for a preset time of period, and a sensed air temperature of either a flow of supply air having traversed the evaporator or a flow of return air returning to the evaporator is changing at a rate less than preset air temperature rate of change, a service alarm is generated indicating a loss of charge warning.

In a further aspect of the method, a sensed air temperature of either a flow of supply air having traversed the evaporator or a flow of return air returning to the evaporator is changing at a rate less than preset air temperature rate of change, a sensed suction pressure of refrigerant passing to a suction inlet to the compression device is compared to a preset low suction pressure limit. If the sensed suction pressure of refrigerant passing to a suction inlet to the compression device is less than the preset low suction pressure limit for a preset period of time, a shut down alarm is generated warning an urgent system refrigerant recharge is required.

BRIEF DESCRIPTION OF THE DRAWINGS

For a further understanding of the disclosure, reference will be made to the following detailed description which is to be read in connection with the accompanying drawing, wherein.

DETAILED DESCRIPTION OF THE INVENTION

Figure 1:
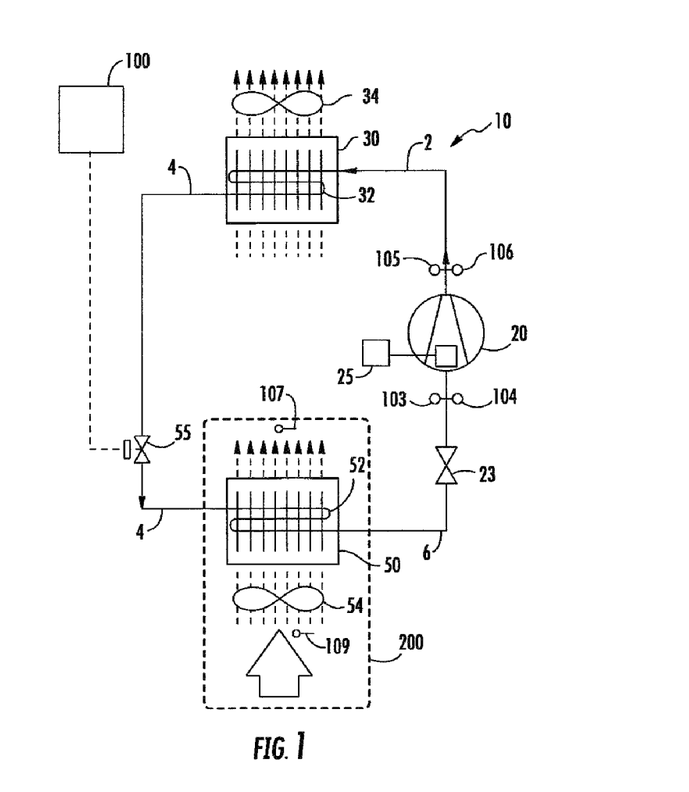
FIG. 1 is a schematic diagram illustrating an embodiment of a simple refrigerant vapor compression system equipped with a constant speed compressor.
Figure 2:
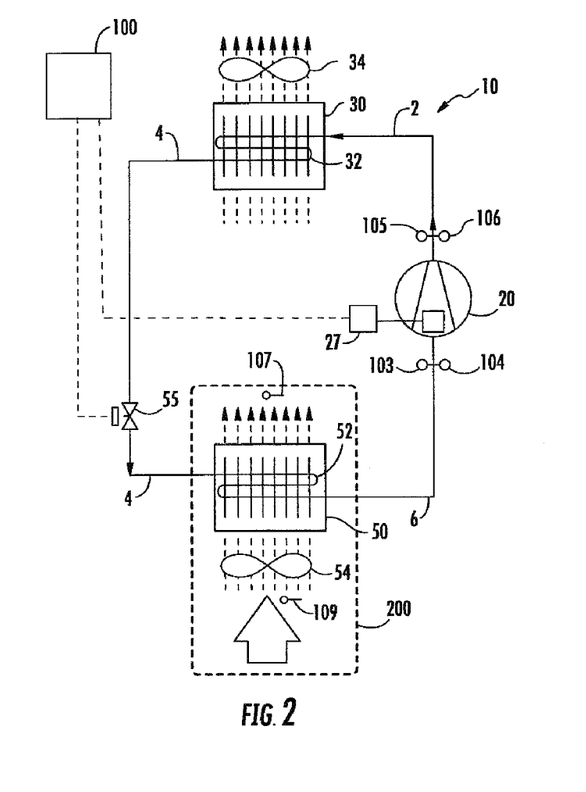
FIG. 2 is a schematic diagram illustrating an embodiment of a simple refrigerant vapor compression system equipped with a variable speed compressor.
Figure 3:
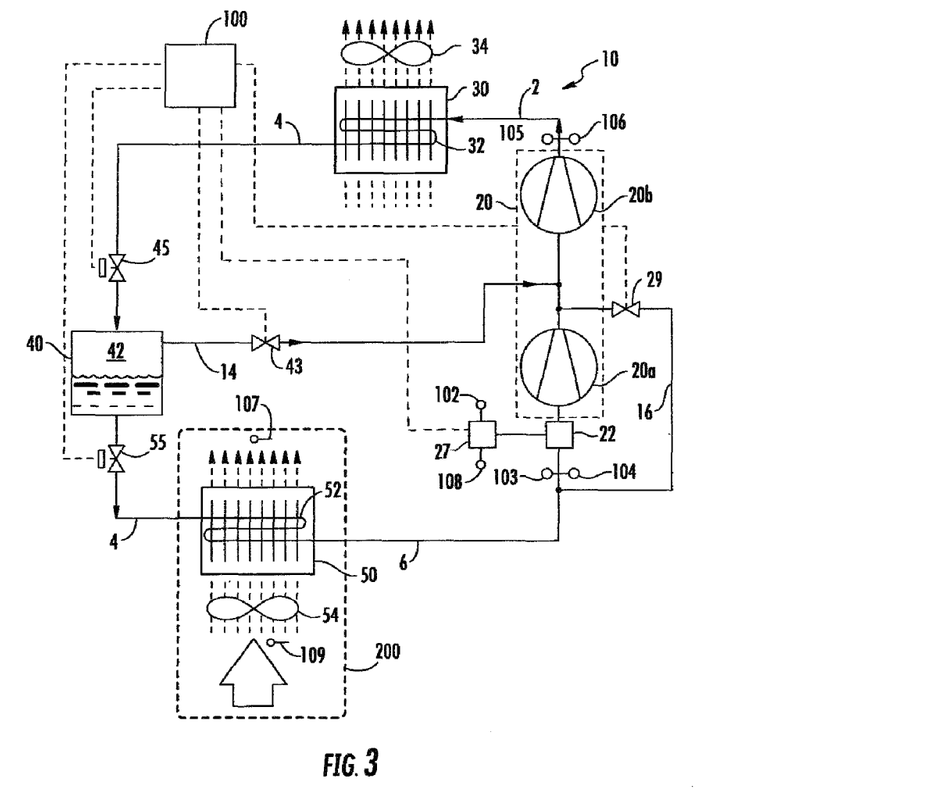
FIG. 3 is a schematic diagram illustrating a more complex refrigerant vapor compression system incorporating an economizer circuit.

Referring initially to FIGS. 1-3 of the drawing, there are depicted various exemplary embodiments of a refrigerant vapor compression system, generally designated 10, to which the method for detecting and/or diagnosing a loss of refrigerant charge as disclosed herein is applicable. The refrigerant vapor compression systems 10 are depicted in connection with refrigerating the air or other gaseous atmosphere within the temperature controlled cargo space 200 of a truck, trailer, container or the like for transporting perishable/frozen goods. However, the refrigerant vapor compression systems may also be used in conditioning air to be supplied to a climate controlled comfort zone within a residence, office building, hospital, school, restaurant or other facility, or in refrigerating air supplied to display cases, merchandisers, freezer cabinets, cold rooms or other perishable/frozen product storage areas in commercial establishments.

Each of the refrigerant vapor compression systems 10 includes a refrigerant compression device 20, a refrigerant heat rejection heat exchanger 30, a refrigerant heat absorption heat exchanger 50, and an electronic expansion valve 55 operatively associated with the refrigerant heat absorption heat exchanger 50, with refrigerant lines 2, 4 and 6 connecting the aforementioned components in a refrigerant circuit in accordance with a conventional refrigeration cycle. The refrigerant vapor compression systems 10 are filled, i.e. charged, with a total amount of refrigerant predetermined to provide sufficient refrigerant within the system to ensure proper performance of the system under most contemplated operating conditions, herein referred to as the refrigeration charge.

The refrigerant vapor compression systems 10 depicted in FIGS. 1 and 2 are basic non-economized systems. These systems are typically charged with a refrigerant having a relatively high critical point, such as conventional hydrochlorofluorocarbon and hdyrofluorocarbon refrigerants, and are operated in a subcritical cycle. In a refrigerant vapor compression system operating in a subcritical cycle, the refrigerant heat rejection heat exchanger 30 functions as a refrigerant condenser and the refrigerant heat absorption heat exchanger 50 functions as a refrigerant evaporator.

The refrigeration system 10 depicted in FIG. 3 is designed for operation in a transcritical cycle and is charged with a refrigerant having a relatively low critical point, such as for example, but not limited to, carbon dioxide and refrigerant mixtures containing carbon dioxide, referred to herein by the common term: carbon dioxide refrigerant. In a refrigerant vapor compression system operating in a transcritical cycle, the refrigerant heat rejection heat exchanger 30 functions a gas (refrigerant vapor) cooler and the refrigerant heat absorption heat exchanger 50 functions as a refrigerant evaporator. However, it is to be understood that the refrigerant vapor compression system 10 depicted in FIG. 3 may also be operated in a subcritical cycle with a relatively high critical point, such as conventional hydrochlorofluorocarbon and hdyrofluorocarbon refrigerants.

The compression device 20 functions to compress refrigerant vapor from a lower suction pressure to a higher discharge pressure and to circulate refrigerant through the primary refrigerant circuit. In the embodiments depicted in FIGS. 1 and 2, the compression device 20 may comprise a single compressor, such as for example, but not limited to, a reciprocating compressor, a scroll compressor, a screw compressor, a rotary compressor, or any other type of refrigerant compressor or a combination of any such compressors, as desired for a particular application of the refrigerant vapor compression system 10. In the embodiment depicted in FIG. 1, the compressor 20 is driven at a constant speed by a constant speed motor (housed within the compressor 20) driven by a constant speed drive 25. With a constant speed compressor, the refrigeration vapor compression system 10 may optionally also include a suction modulation valve (SMV) 23 interdisposed in refrigerant line 6 at a location between the outlet of the refrigeration heat absorption heat exchanger 50 and the suction inlet to the compression device 20, as depicted in FIG. 1, to provide capacity modulation functionality. In the embodiment depicted in FIG. 2, the compressor 20 is driven at multiple speeds by a variable speed motor (housed within the compressor 20) driven by a variable frequency drive 27.

In the embodiment depicted in FIG. 3, the compression device 20 comprises a variable speed compression device driven by a variable frequency drive as in the FIG. 2 embodiment. The compression device may comprise a single multiple stage refrigerant compressor, such as for example, a screw compressor or a reciprocating compressor disposed in the primary refrigerant circuit and having a first compression stage 20a and a second compression stage 20b with the first compression stage feeding the second compression stage. Alternatively, the compression device 20 may comprise a pair of independent compressors 20a and 20b, connected in series refrigerant flow relationship in the primary refrigerant circuit via a refrigerant line connecting the discharge outlet port of the first compressor 20a in refrigerant flow communication with the suction inlet port of the second compressor 20b. In the independent compressor embodiment, the compressors 20a and 20b may be scroll compressors, screw compressors, reciprocating compressors, rotary compressors or any other type of compressor or a combination of any such compressors.

In the refrigerant heat rejection heat exchanger 30, hot, high pressure refrigerant vapor discharged from the compression device 20 passes in heat exchange relationship with a cooling medium, such as for example, but not limited to ambient air or water, and is cooled either to a low lower temperature vapor (transcritical cycle) or condensed to a liquid (subcritical cycle). In the depicted embodiments, the refrigerant heat rejection heat exchanger 30 includes a finned tube heat exchanger 32, such as for example a fin and round tube heat exchange coil or a fin and mini-channel flat tube heat exchanger, through which the refrigerant passes in heat exchange relationship with ambient air being drawn through the finned tube heat exchanger 32 by the fan(s) 34 associated with the gas cooler 30.

Whether the refrigerant vapor compression system 10 is operating in a transcritical cycle or a subcritical cycle, the refrigerant heat absorption heat exchanger 50 serves an evaporator wherein refrigerant liquid or a mixture of refrigerant liquid and vapor is passed in heat exchange relationship with a fluid to be cooled, most commonly air, drawn from and to be returned to a temperature controlled environment, such as the cargo box 200 of a refrigerated transport truck, trailer or container, or a display case, merchandiser, freezer cabinet, cold room or other perishable/frozen product storage area in a commercial establishment, or to a climate controlled comfort zone within a residence, office building, hospital, school, restaurant or other facility. In the depicted embodiments, the refrigerant heat absorption heat exchanger 50 comprises a finned tube heat exchanger 52 through which refrigerant passes in heat exchange relationship with air drawn from and returned to the refrigerated cargo box 200 by the evaporator fan(s) 54 associated with the evaporator 50. The finned tube heat exchanger 52 may comprise, for example, a fin and round tube heat exchange coil or a fin and mini-channel flat tube heat exchanger.

As the amount of refrigerant circulating through the refrigerant circuit of the refrigerant vapor compression system will vary with the operating conditions to which the system is subjected, the refrigerant charge will amount to more refrigerant than is actually required under some operating conditions. Thus, it is customary to provide a buffer vessel in the refrigerant for holding refrigerant that is excess of the amount of refrigerant circulating under the then prevailing operating conditions. In the subcritical cycle systems depicted in FIGS. 1 and 2, the refrigerant vapor compression systems 10 may include a receiver and/or an accumulator (neither shown) disposed in the refrigerant circuit as in conventional practice. In the embodiment of the refrigerant vapor compression system 10 depicted in FIG. 3, a flash tank 40 is included in the refrigerant circuit which serves as a buffer vessel for excess refrigerant, as well as an economizer.

The refrigerant vapor compression system 10 depicted in FIG. 3, which as mentioned before is configured for operation in a transcritical cycle, further includes an economizer circuit that includes the aforementioned flash tank 40, as well as an electronic expansion valve 45 operatively associated with the flash tank 40, and a refrigerant vapor injection line 14. The flash tank economizer 40 is interdisposed in refrigerant line 4 of the primary refrigerant circuit downstream with respect to refrigerant flow of the refrigerant heat rejection heat exchanger 30 and upstream with respect to refrigerant flow of the refrigerant heat absorption heat exchanger 50. The flash tank economizer 40 defines a separation chamber 42 wherein refrigerant in the liquid state collects in a lower portion of the separation chamber 42 and wherein refrigerant in the vapor state collects in the portion of the separation chamber 42 above the liquid refrigerant.

The refrigerant vapor injection line 14 establishes refrigerant flow communication between an upper portion of the separation chamber 42 of the flash tank economizer 40 and an intermediate stage of the compression process. A vapor injection flow control device 43 may be interdisposed in vapor injection line 14. The vapor injection flow control device 43 may be a flow control valve selectively positionable between an open position wherein refrigerant vapor flow may pass through the refrigerant vapor injection line 14 and a closed position wherein refrigerant vapor flow through the refrigerant vapor injection line 14 is blocked, such as for example, but not limited to, a two-position solenoid valve of the type selectively positionable between a first open position and a second closed position.

In the exemplary embodiment of the refrigerant vapor compression system depicted in FIG. 3, additional capacity modulation is provided by a compressor unload circuit that includes refrigerant line 16 and unload flow control valve 29 interdisposed in refrigerant line 16. Refrigerant line 16 establishes refrigerant flow communication between an intermediate stage of the compression process and the suction inlet of the compression device. The unload flow control valve may have a closed position and a full open position, and optionally one or more intermediate part open positions.

The refrigerant vapor compression system 10 also includes a control system operatively associated therewith for controlling operation of the refrigerant vapor compression system 10. The control system includes a controller 100 that determines the desired mode of operation in which to operate the refrigerant vapor compression system 10 based upon consideration of refrigeration load requirements, ambient conditions and various sensed system operating parameters and controls operation of various system components, including but not limited to the compression device 20, the fans 34 and 54, and the electronic expansion valve 55. As in conventional practice, the controller 100 also includes various sensors operatively associated with the controller 100 and disposed at selected locations throughout the system for monitoring various operating parameters by means of various sensors operatively associated with the controller, such as by way of example, but not limitation, a temperature sensor 103 and a pressure sensor 104 for sensing the refrigerant suction temperature and pressure, respectively, a temperature sensor 105 and a pressure sensor 106 for sensing refrigerant discharge temperature and pressure, respectively, and an ambient air temperature sensor (not shown) for sensing outdoor air temperature, all not shown. On a refrigerant vapor compression system 10 equipped with a variable speed drive 27 for driving the compression device 20 at multiple speeds, the control system further includes a sensor 102 for sensing the speed of the compression drive 20 and a sensor 108 for sensing the current drawn by the compression device 20.

Figure 4:
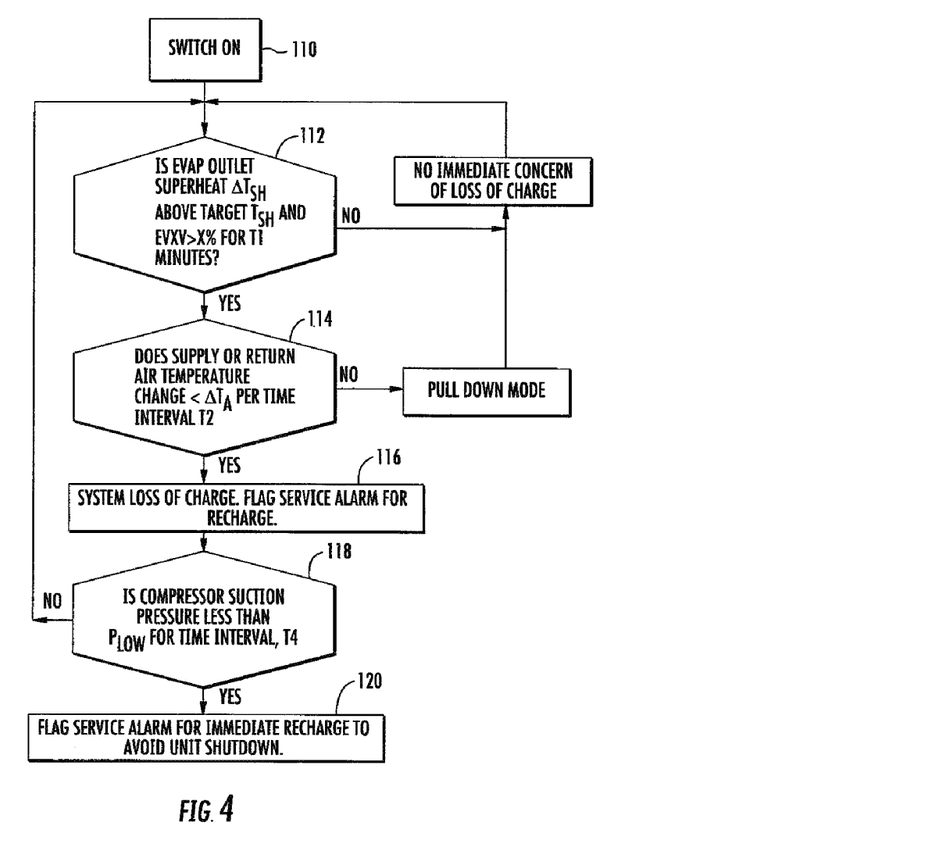
FIG. 4 is a flow chart illustrating an embodiment of a method as disclosed herein for detecting and diagnosing a loss of refrigerant charge in a refrigerant vapor compression system having a fixed speed compressor, including but not limited to the refrigerant vapor compression system shown in FIG. 1.
Figure 5:
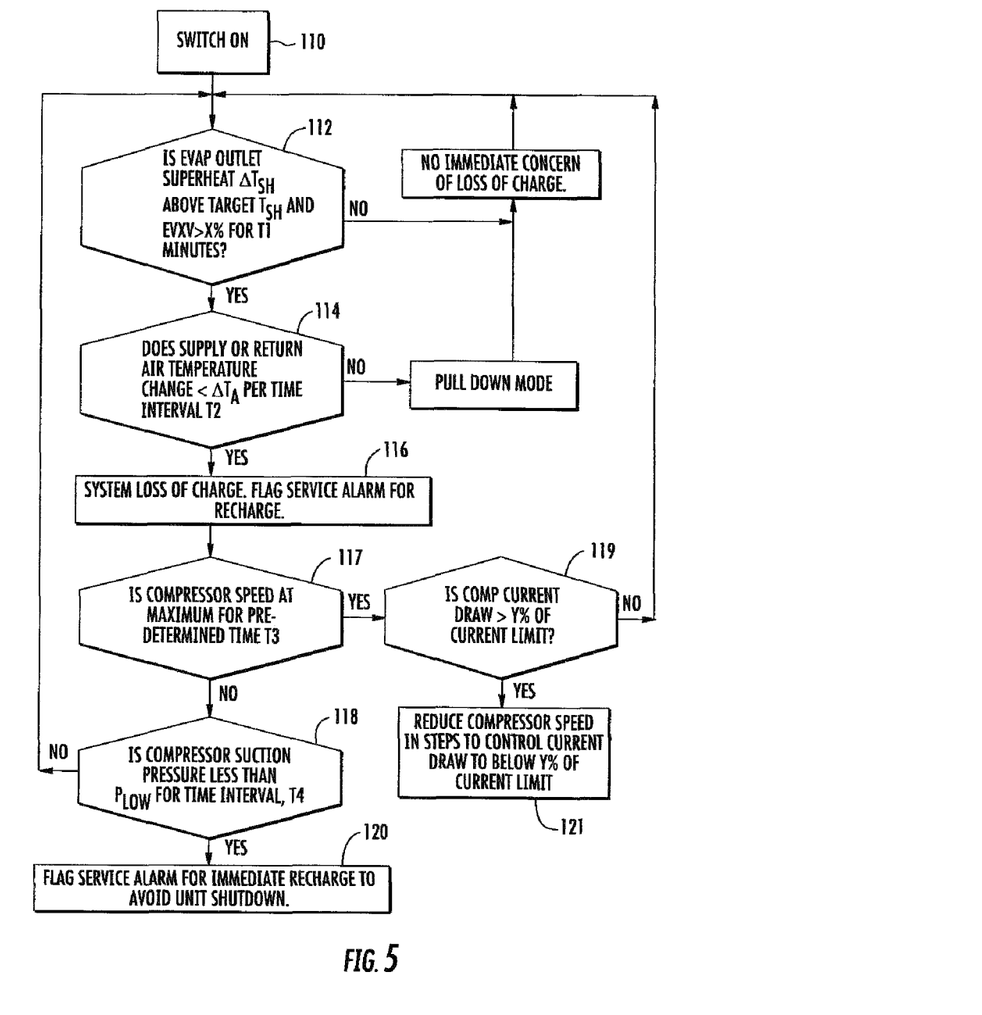
FIG. 5 is a flow chart illustrating an embodiment of a method as disclosed herein for detecting and diagnosing a loss of refrigerant charge in a refrigerant vapor compression system having a variable speed compressor, including but not limited to the refrigerant vapor compression systems shown in FIGS. 2 and 3.

In the refrigerant vapor compression system disclosed herein, the controller 100 is configured to detect and diagnose, in real time, a refrigerant charge loss in accordance with the method disclosed herein. The controller 100 is further configured to flag an alarm in the event a refrigerant charge loss is detected. The controller 100 may be configured to flag either a service alarm or a shut down alarm, depending upon the degree of the detected refrigerant charge loss. In response to the alarm, appropriate action may be taken to prevent a resultant loss in cooling capacity and to protector the compression device 20 and other components of the refrigerant vapor compression system 10 from damage as a result as continued operation with an inadequate refrigerant charge. FIGS. 4 and 5 present flow charts depicting the method disclosed herein for detecting and diagnosing a system refrigerant charge loss. FIG. 4 depicts the method as applied to a refrigerant vapor compression system having a constant speed compression device, and FIG. 5 depicts the method as applied to a refrigerant vapor compression system equipped with a variable speed compression device.

To detect a refrigerant charge loss, the controller 100 monitors the amount of superheat in the refrigerant vapor leaving the evaporator 50, referred to herein as the evaporator outlet superheat, EOSH, and the degree of openness of the electronic expansion valve 55, 100% representing a fully open valve condition and 0% representing a fully closed valve condition. The degree of openness of the electronic expansion valve 55 is an output signal from the electronic expansion valve 55 that is recorded by the controller 100. The controller 100 uses the refrigerant suction temperature sensed by temperature sensor 103 and the refrigerant suction pressure sensed by pressure sensor 104 to calculate the evaporator outlet superheat according to conventional techniques.

Referring now to FIGS. 4 and 5, the controller 100 at block 110 at selected intervals initiates the method for detecting and diagnosing a refrigerant charge loss. At block 112, the controller 100 compares the sensed evaporator outlet superheat, $EOSH_{SENSED}$, to a preset target evaporator outlet superheat, $EOSH_{TARGET}$, to determine whether $EOSH_{SENSED}$ is greater than $EOSH_{TARGET}$ by at least a preset amount $\Delta EOSH$. The controller 100 also compares the sensed degree of openness of the electronic expansion valve 55, $OPEN_{SENSED}$, to a preset upper limit for the degree of openness, $OPEN_{LIMIT}$, for the electronic expansion valve 55. If the sensed evaporator outlet superheat $EOSH_{SENSED}$ is greater than $EOSH_{TARGET}$ by at least the preset amount $\Delta EOSH$, for example by a preset amount in the range from at least 5° F. (2.8° C.) to 20° F. (11.1° C.), and in a particular embodiment wherein the system is charged with a carbon dioxide refrigerant at least 10° F. (5.5° C.), and the sensed degree of openness, $OPEN_{SENSED}$, of the electronic expansion valve 55 is greater than $OPEN_{LIMIT}$, for example greater than 90%, for a preset period of time, t1, for example at least 3 minutes to 10 minutes, and in an embodiment greater than 95% for at least 5 minutes, the controller 100 performs a check to determine the then current operating mode of the refrigerant vapor compression system.

To determine the current operating mode of the refrigerant vapor compression system, at block 114, the controller 100 determines the then current rate of change of at least one of the temperature, TS, of the supply air having traversed the evaporator 50 and being supplied to the climate controlled space, which in the depicted embodiments is cargo space 200, or the temperature, TR, of the return air returning from the climate control space to pass through the evaporator 50. The transport refrigerant vapor compression system 100 includes at least one of or both of, a sensor 107 for sensing the temperature, TS, of the supply air and a sensor 109 for sensing the temperature, TR, of the return air. The controller is configured to monitor the sensors 107 and 109 and calculate the rate of change of at least one of TS and TR over a specified period of time. If the rate of change TS or TR per minute, $\Delta TS$ or $\Delta TR$, is less than a preset rate of temperature change, $\Delta Tair$, for example 0.5° F. (0.28° C. per minute, the refrigerant vapor compression system 10 is operating in a steady state mode to maintain the air temperature within the cargo space 200 at a preset temperature. However, if the rate of change $\Delta TS$ or $\Delta TR$ is more than a preset rate of temperature change, $\Delta Tair$, the refrigerant vapor compression system 10 is operating in a pulldown mode to rapidly reduce the air temperature within the cargo space 200.

If the controller 100 determines that the refrigerant vapor compression system 10 is operating in a steady state mode with the sensed evaporator outlet superheat $EOSH_{SENSED}$ being greater than $EOSH_{TARGET}$ by at least the preset amount $\Delta EOSH$ and the sensed degree of openness, $OPEN_{SENSED}$, of the electronic expansion valve 55 being greater than $OPEN_{LIMIT}$, the controller 100 understands that the sensed evaporator outlet superheat and the degree of openness of the electronic expansion valve 55 are excessive and therefore indicative of a loss of refrigerant charge resulting in an inadequate refrigerant charge. Having determined that a loss of refrigerant charge has occurred, the controller 100 at block 116 generates a service alarm flagging the need for a refrigerant recharge.

If the refrigerant vapor compression system 10 is equipped with a constant speed compressor 20, the controller 100 next proceeds as further depicted in FIG. 4 to diagnose the severity of the refrigerant charge loss. At block 118, compares the compressor suction pressure, $PS_{SENSED}$, to a preset low suction pressure limit, $P_{LOW}$. If the compressor suction pressure, $PS_{SENSED}$, is less than the preset low suction pressure limit, $P_{LOW}$, for a time interval, t4, the controller 100 at block 120, generates an alarm flagging a shut down warning. If an immediate system refrigerant recharge is not performed, the controller 100 shuts the system down. However, if the compressor suction pressure, $PS_{SENSED}$, is not less than the preset low suction pressure limit, $P_{LOW}$, for a time interval, t4, controller 100 returns to block 112 and repeats the method. For a refrigerant vapor compression system charged with a carbon dioxide refrigerant, controller 100 may be configured to flag at shut down warning at block 120 if the compressor suction pressure, $PS_{SENSED}$, is less than the preset low suction pressure limit, $P_{LOW}$, in the range of from 120 psia (8.3 bars) to 200 psia (13.8 bars), for the specified time interval, t4. In an embodiment, the controller 100 may be configured to flag a shut down warning at block 120 if the compressor suction pressure, $PS_{SENSED}$, is less than the preset low suction pressure limit, $P_{LOW}$, of about 150 psia (10.3 bars) for a time interval of one minute. For clarity, psia refers to pounds per square inch absolute.

If the refrigerant vapor compression system 10 is equipped with a variable speed compressor 20, the controller 100 next proceeds as further depicted in FIG. 5 to diagnose the severity of the refrigerant charge loss by first checking whether the compressor is operating at maximum speed. At block 117, the controller 100 determines whether the compressor 20 has been operating at maximum speed for a predetermined time interval, t3, for example five minutes. If the compressor 20 has not been operating at maximum speed for the predetermined tine interval, t3, the controller proceeds to perform the suction pressure comparison at block 118 as discussed above and to flag a shut down alarm at block 120 if the compressor suction pressure, $PS_{SENSED}$, is less than the preset low suction pressure limit, $P_{LOW}$, for a time interval, t4, or if the compressor suction pressure, $PS_{SENSED}$, is not less than the preset low suction pressure limit, $P_{LOW}$, for a time interval, t4, the controller 100 returns to block 112 and repeats the method.

However, if the controller 100 determines at block 117 that the compressor 20 has been operating at maximum speed for the predetermined tine interval, t3, the controller 100 will, at block 119, check the current being drawn by the compressor 20 in comparison a maximum current draw limit. If the sensed compressor current draw is greater than a preset percentage, Y %, of the maximum current draw limit, the controller 100, at block 121, reduces the speed of the compressor 20 in a series of step reductions until the sensed current draw drops below the preset percentage, Y %, of the maximum current draw limit. If at block 119, the controller 100 determines that the sensed current draw is not greater than the preset percentage, Y %, of the maximum current draw limit, the controller 100 returns to block 112 and repeats the method.

In a further aspect of the disclosure, the controller 100 may be configured to calculate the actual refrigerant charge level. If the ambient air temperature is higher than 87° F. (30.5° C.) and the compressor 20 has been off for more than a sufficient time to permit the refrigerant within the refrigerant vapor compression system 10 to migrate to an equilibrium condition, for example more than twenty minutes, the controller 100 may initiate a refrigerant charge calculation. At the equilibrium condition, the refrigerant pressure is substantially equalized throughout the system and the refrigerant will be at ambient temperature. To calculate the actual refrigerant charge, the controller 100 first calculates the refrigerant density based on the sensed discharge pressure and the ambient air temperature, and then multiplies the calculated refrigerant density with the internal volume of the system 10, thereby determining the weight of refrigerant currently resident within the system 10, i.e. the actual refrigerant charge. The controller 100 may also be configured to compare the calculated system refrigerant charge to a design system refrigerant charge, for example a factory installed system refrigerant charge, and to generate an alarm flagging a loss of refrigerant charge is the calculated is less than a specified percent of the preferred system refrigerant charge, for example less than 85% of the design system refrigerant charge. In an embodiment, the controller 100 is configured to initiate a refrigerant charge calculation upon completion of an evaporator defrost cycle before restarting the compression device 20 to return the system 10 to operation in a cooling mode.

The terminology used herein is for the purpose of description, not limitation. Specific structural and functional details disclosed herein are not to be interpreted as limiting, but merely as basis for teaching one skilled in the art to employ the present invention. Those skilled in the art will also recognize the equivalents that may be substituted for elements described with reference to the exemplary embodiments disclosed herein without departing from the scope of the present invention.

While the present invention has been particularly shown and described with reference to the exemplary embodiments as illustrated in the drawing, it will be recognized by those skilled in the art that various modifications may be made without departing from the spirit and scope of the invention. Therefore, it is intended that the present disclosure not be limited to the particular embodiment(s) disclosed as, but that the disclosure will include all embodiments falling within the scope of the appended claims.

We claim:

1. A method for detecting in real-time a refrigerant charge loss in a refrigerant vapor compression system having a refrigerant circuit including a refrigerant compression device, a refrigerant heat rejection heat exchanger, an evaporator and an electronic expansion valve operatively associated with the evaporator, the method comprising:
   determining at a controller whether both a sensed evaporator outlet superheat exceeds a target evaporator outlet superheat by at least a preset amount of superheat and a sensed degree of openness of the electronic expansion valve exceeds a preset degree of openness for a preset time of period;
   in response to both the sensed evaporator outlet superheat exceeding the target evaporator outlet superheat by at least the preset amount of superheat and the sensed degree of openness of the electronic expansion valve exceeding the preset degree of openness for the preset time of period, determining at the controller whether at least one air temperature of a sensed supply air temperature of a flow of air having traversed the evaporator or a sensed return air temperature of a flow of air returning to the evaporator is changing at a rate less than a preset air temperature rate of change; and
   in response to the at least one air temperature of the sensed supply air temperature of a flow of air having traversed the evaporator or the sensed return air temperature of a flow of air returning to the evaporator changing at a rate less than the preset air temperature rate of change, the controller generating a service alarm indicating a loss of charge warning.

2. The method as set forth in claim 1 further comprising:
   in response to the at least one air temperature of the sensed supply air temperature of a flow of air having traversed the evaporator or the sensed return air temperature of a flow of air returning to the evaporator changing at a rate less than the preset air temperature rate of change, comparing a sensed suction pressure of refrigerant passing to a suction inlet to the compression device to a preset low suction pressure limit, and in response to the sensed suction pressure of refrigerant passing to a suction inlet to the compression device being less than the preset low suction pressure limit for a preset period of time, generating a shut down alarm warning an urgent system refrigerant recharge is required.

3. The method as set forth in claim 1 further comprising:
   in response to the at least one air temperature of the sensed supply air temperature of a flow of air having traversed the evaporator or the sensed return air temperature of a flow of air returning to the evaporator changing at a rate less than the preset air temperature rate of change,
   determining whether a sensed speed of the compression device is at a maximum speed limit for the compression device for a predetermined period of time.

4. The method as set forth in claim 3 further comprising:
   in response to the sensed speed of the compression device being less than the preset maximum speed limit for the speed of the compression device, comparing a sensed suction pressure of refrigerant passing to a suction inlet to the compression device to a preset low suction pressure limit, and in response to the sensed suction pressure of refrigerant passing to a suction inlet to the compression device being less than the preset low suction pressure limit for a preset period of time, generating a service alarm indicating an urgent system refrigerant recharge required warning.

5. The method as set forth in claim 3 further comprising:
   in response to the sensed speed of the compression device being at the maximum speed limit for the speed of the compression device throughout a preset time interval, comparing a sensed current draw by the compression device to a maximum current draw limit.

6. The method as set forth in claim 5 further comprising:
   in response to the sensed current draw exceeding a preset percentage of the maximum current draw limit, reducing the speed of the compression device to a lower speed at which the current draw associated with said lower speed is below the preset percentage of the maximum current draw limit.

7. The method as set forth in claim 6 wherein the preset percentage of the maximum current draw limit is at least 90% of the maximum current draw.

8. The method as set forth in claim 5 wherein the preset time interval is at least 3 minutes to 10 minutes.

9. The method as set forth in claim 1, wherein the preset amount is in a range from at least 5° F. (2.8° C.) to 20° F. (11.1° C.), the preset degree of openness is 90%, and the preset time of period is at least 5 minutes.

10. The method as set forth in claim 1 wherein the preset air temperature rate of change is 0.5° F. (0.27° C.) per minute.

11. The method as set forth in claim 2 wherein the refrigerant comprises a carbon dioxide refrigerant and the present low suction pressure limit is a pressure in the range from 120 pounds per square inch absolute (8.3 bars absolute) to 200 pounds per square inch absolute (13.8 bars).

12. The method as set forth in claim 11 wherein the preset low suction pressure limit is about 150 pounds per square inch absolute (10.3 bars).

* * * * *